Figure 1:
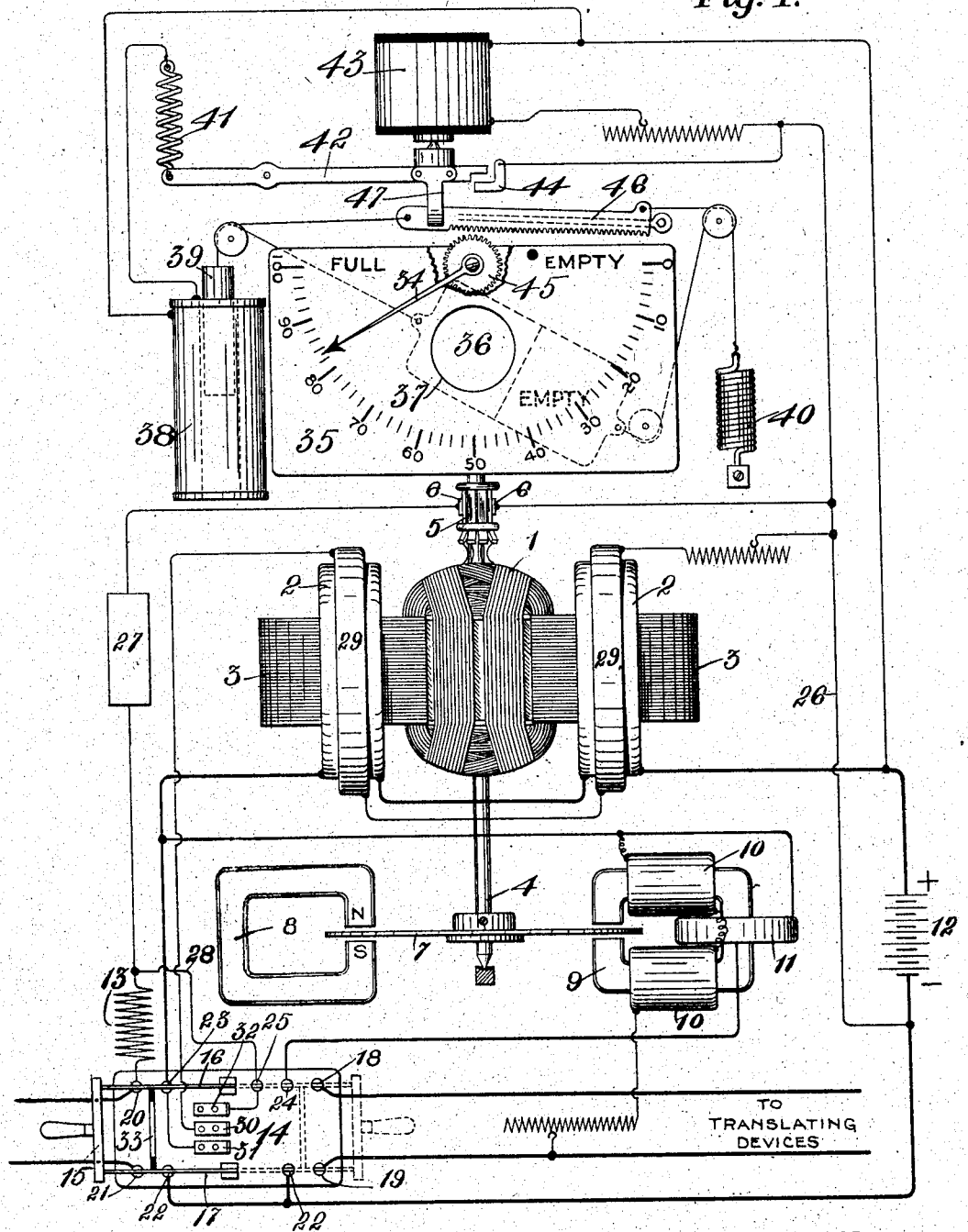

No. 796,065. PATENTED AUG. 1, 1905.
T. DUNCAN.
METER.
APPLICATION FILED APR. 28, 1902.
2 SHEETS—SHEET 2.
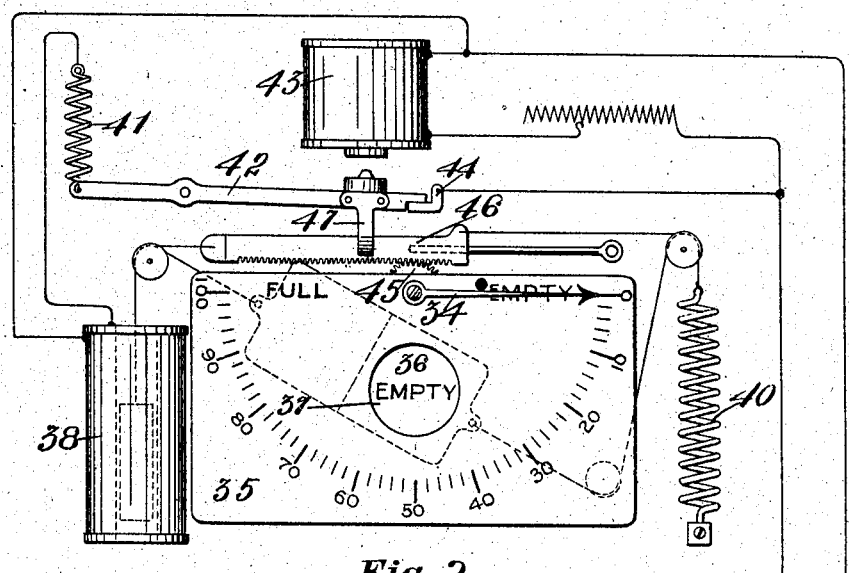
Fig. 2.
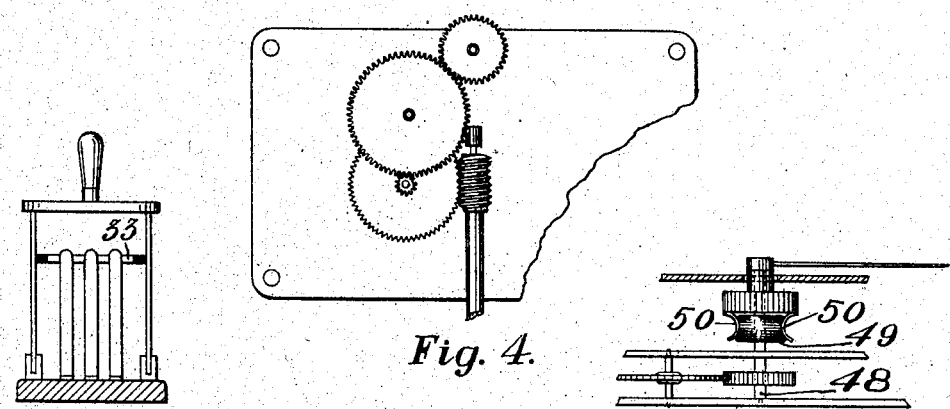
Fig. 3.
Fig. 4.
Fig. 5.
Fig. 6.
WITNESSES:
Samuel R. Bachtel
May H. Label
INVENTOR.
Thomas Duncan
BY Charles A. Brown & Cragg
ATTORNEYS.

UNITED STATES PATENT OFFICE.

THOMAS DUNCAN, OF LAFAYETTE, INDIANA.

METER.

No. 796,065.　　　Specification of Letters Patent.　　　Patented Aug. 1, 1905.

Application filed April 28, 1902. Serial No. 104,963.

*To all whom it may concern:*

Be it known that I, THOMAS DUNCAN, a citizen of the United States, residing at Lafayette, in the county of Tippecanoe and State of Indiana, have invented a certain new and useful Improvement in Meters, of which the following is a full, clear, concise, and exact description, reference being had to the accompanying drawings, forming a part of this specification.

My invention relates to meters, and has for its object the provision of an improved meter for storage-battery work.

It is a well-known fact that if a battery of storage-cells be charged and then allowed to remain idle for a time they become discharged through leakage or through abnormal internal conditions. If we take the condition of a storage battery which has been fully charged and which is thereafter allowed to remain idle for some space of time, probably a week, the charge thereof will be to a large extent dissipated, due to the discharge between the plates and due to a dissolution of the chemicals composing the plates, so that the battery after a given space of time, depending upon the character of the materials employed in the manufacture, will be reduced to a state of no charge. In this condition it is of course inadvisable to use the battery, and to guard against this is one of the main objects of my present invention. Even if the battery were not completely discharged and the same were used, it will be apparent that not the full amount of energy could be extracted therefrom, and if the storage battery is used in the operation of automobiles it will be seen that the distance covered would be greatly reduced or a return of the vehicle to its starting-point under some conditions impossible.

My invention further contemplates the provision of improved means whereby the exact amount of this leakage discharge of the battery may be indicated upon a suitable scale.

In the preferred embodiment of my invention to accomplish the object stated I employ a switch which has three operative positions, one of which is used for charging, the other for discharging, and the third for the open circuit or idle position of the battery.

In the use of storage batteries another frequent cause of complete or nearly complete discharge is due to internal short circuits or causes of a similar nature, and it has hitherto been impossible with the ordinary forms of indicators employed for the storage batteries to tell whether such a condition had obtained during the time the battery had remained unused.

It is the further object of my invention to provide means whereby suitable indication may be given when the storage battery has for some reason, such as internal short-circuit or the like, become discharged.

In the preferred embodiment of my invention I employ an indicator which may in one position indicate a "full" or charged condition of the storage battery and in the other position an "empty" or discharged condition of the storage battery. The indicator in its normal position, in which it may indicate a full condition of the battery, is actuated, preferably, by an electromagnet to indicate the empty position, circuit through which electromagnet is normally open, but closed when the electromotive force of the battery has reached its lowest or discharge voltage. The circuit is completed through the electromagnet, preferably by a potential circuit-closer, which responds when the pressure of the battery has reached its lowest predetermined value.

Further objects of my invention are the provision of means whereby the pointer of the indicator-dial may be reset to zero when the battery has become exhausted during idleness or when it may have retained a partial charge when last used and to associate means with the battery for compensating for the varying efficiencies at different rates of charge and discharge.

Further objects and advantages of my invention will be apparent from the construction which I will now describe in connection with the accompanying drawings, illustrating the preferred embodiment thereof, in which—

Figure 1 is a diagrammatic view showing the circuit arrangements for my improved meter. Fig. 2 is a view showing the indicating apparatus and associated mechanism occupying an alternative position to that shown in Fig. 1. Fig. 3 is a detailed view of the switch which I prefer to employ. Fig. 4 is a detailed view of gearing of the counting mechanism. Fig. 5 is a view more clearly showing the construction of the pointer-actuating mechanism. Fig. 6 is a detail of construction.

Like characters of reference indicate like parts throughout the different figures.

In Fig. 1 I have shown my improved meter as consisting of a rotatable shunt-wound armature 1 in association with field-coils 2 2, provided upon suitable cores 3 3. The armature is mounted upon a spindle 4, carrying a commutator 5, against which bear brushes 6 6. The spindle 4 also carries a damping-disk 7, associated with a permanent magnet 8 and an electromagnet 9. The electromagnet 9 has two sets of energizing-coils, the shunt-coils 10 10 comprising one set and the differentially-connected series coil 11 the other set. The change in torque due to the inclusion or exclusion of the resistance 13 is compensated for by the inclusion or exclusion, respectively, of the shunt-coils 10 10. The meter is associated with a storage battery 12 to indicate its operative condition—that is, its degree of charge or discharge.

The construction of meter so far explained and which is the one I prefer to employ in this connection is one in which the means for actuating the motive element are arranged in such manner as to compensate for the varying rates of charge or discharge to which the battery in its normal operation is subject. To this end the coils 10 10 and 11 of the damping-magnet 9 are not in circuit while the meter is being charged, but are in circuit while the same is being discharged. In order to compensate for the increase of rotation when these coils are not in circuit, I employ a resistance 13, which is included in circuit with the armature during charge and excluded during discharge, thus increasing or decreasing the armature-current, depending upon whether the coils of the electromagnet 9 are included in the circuit or excluded therefrom. The operative condition of the storage battery is changed by means of a switch 14, a section of which is shown most clearly in Fig. 3. The switch 14 is provided with a switch-handle 15, having switch-blades 16 17, which are pivotally mounted upon the base of said switch. The switch-base is provided with terminals 18 19, leading to translating devices. Contacts 20 21 are also provided which lead to a charging source of current, by means of which current may be supplied to the storage batteries.

I have for convenience indicated the terminals of the battery 12 by the + and − signs, although it will of course be apparent that the polarity of the battery does not at all enter into the invention, the signs being used in order to facilitate a description of the connections.

The negative pole of the battery 12 is connected to contacts 22 22, which are mounted on opposite sides of the pivotal support of the switch-blade 17, which I do in preference to connecting said negative terminal directly to the pivotal mounting in order to get a more perfect electrical connection. When the switch is in the position indicated by the full lines in Fig. 1—that is, while the battery is being charged—the left-hand contact 22 is connected to the contact 21, while in the reverse position of the switch, as shown in dotted lines, the right-hand contact 22 is connected to the contact-terminal 19.

The positive pole of the battery is connected through the series energizing-windings 2 2 directly to the contact-post 23 while the battery is being charged, the contact-post 23 being then electrically connected by means of the switch-plate to the contact-post 20. When the battery is being discharged, the positive pole of the battery is connected to a switch-contact as follows: from the positive pole of said battery through the series energizing-windings 2 2 to the series winding 11 of the auxiliary damping-magnet 9 and from there to the contact-post 24, provided upon the switch-base of the switch 14. Thus in the alternative position of the switch-handle—that is, while the battery is discharging—the contact-post 24 is electrically connected to the contact-post 18 and a further contact-post 25, whereby the series winding 11 is not in circuit when the battery is charging, but is in circuit when the battery is discharging. The shunt-winding of the damping-magnet 9 is included between the conductor leading to the series winding 11 and the conductor which is connected with the contact-post 19.

The armature-circuit may be traced from the negative pole of the battery, through the conductor 26, the armature-winding 1 by way of the commutator and brushes, the adjusting resistance 27, and the resistance 13 to the contact-post 20 and from there by way of the switch-plate 16 to the conductor leading to the positive pole of the battery while the battery is being charged. When the battery is being discharged, the connection is the same except that a shunt-conductor 28 is included by means of the contact-post 25 about the resistance 13, thus increasing the flow of current through the armature-circuit to compensate for the increased drag applied by the damping-magnet 9.

The series winding 11 compensates for the varying rate of discharge, the construction thus far set forth being readily intelligible to those skilled in the art.

My improved means which I prefer to employ for indicating the leakage discharge of the battery comprise auxiliary coils 29 29, superposed upon the series coils 2 2, which coils are adapted to exert a torque only while the meter is in an idle or unused condition. These coils are connected to the negative pole of the battery by means of the conductor 26. The other terminal of the coils 29 is connected to a centrally-located vertical contact-spring 30. A second vertical contact-spring 31 is placed adjacent to the contact-spring 30 and is directly connected with the positive lead from the battery 12. It will be seen that if the springs 30 and 31 are closed circuited current from the battery 12 will flow through the circuit comprising the same, which circuit includes the coils 29 29. The coils 29 are desirably wound in direction opposite to the coils 2 or are so connected that they magnetize in the same direction. In this condition said coils create a field which acts upon the armature. In order, however, to have the armature rotate under the influence of this field, it is likewise essential that current be supplied to the armature, and this is accomplished by means of a third vertical spring 32, which is connected with the contact-post 25, which leads to the negative pole of the battery 12 after passing through the winding of the armature 1. It will thus be apparent that when the circuit through the three vertical contact-springs is closed current flows through the armature and also through the auxiliary coils 29, whereby a torque is exerted upon the armature which may be in proportion to the leakage coefficient of the battery. The torque of course is quite small as a general rule, and the armature will merely creep under the influence of said torque.

To close-circuit the springs 30, 31, and 32 when the meter is not in use, I employ an auxiliary contact-bar 33, which is mounted upon the switch-blades 16 and 17, but insulated therefrom, as shown. The contact-bar 33 engages the three springs 30, 31, and 32 when said switch is in an elevated or neutral position, which position is always occupied by switches of this character when they are neither connected to the battery with the charging source of current nor with the translating devices. The switch-handle 15 may thus occupy three distinct positions—one when the switch is thrown toward the left, as shown in Fig. 1, in which case the battery 12 is connected with a charging source of current and under which conditions the motor element of the meter registers the amount of charging-current; second, the position as shown in dotted lines in Fig. 1, when said switch-handle is thrown toward the right, whereby the battery is connected with the translating devices and the motive element of the meter measures the amount of current or energy discharged by the battery; third, the upright position indicated most clearly in Fig. 3, in which the battery is neither connected with the charging source of current nor with translating devices, in which case, however, an actuation of the meter is caused which is proportional to the leakage of the battery, which actuation is caused by the close-circuiting of the contact-springs 30, 31, and 32 by the contact-bar 33. The indicating element 34 of the dial 35, which is associated with the motive element of the meter, thus at all times indicates the true state of charge or discharge of the battery, taking into account the loss occasioned in the battery due to leakage as well as compensating for varying efficiencies in the battery due to varying rates of charge or discharge. The great advantage of thus indicating will be readily apparent when it is borne in mind that the storage battery is not in continual use—that is, being either charged or discharged—but remains idle at various times, in which condition it loses its charge, the indication of the amount of loss of the charge having been hitherto impossible with the ordinary form of meters employed. The series coils contribute to the torque of the meter when the switch is in a central or upright position to measure the leakage when the battery is standing idle.

To further eliminate all uncertainty as to the charged or discharged condition of the battery, I provide an indicator which is actuated each time the battery is completely discharged, the actuation thereof depending, in the embodiment thereof herein shown, upon a low-voltage circuit-breaker in the form of an electromagnet. I place an indicator comprising a plate 36, upon which is provided the word "Empty" and which is normally in such position that the display of the word "Empty" is prevented. The indicator 36 is adapted to move at the rear of the dial 35 and to be visible through an opening 37 in said dial. The indicator 36 when in its normal position displays a blank surface back of the opening 37, while in the other position the indicator is drawn across said aperture until the word "Empty" is visible through said opening 37, as shown in Fig. 2. This position is only occupied when for any reason the battery has become completely discharged, giving indication that the same is not ready for use. The battery 12 may for some reason or other become completely discharged, due to internal short circuits or the like generally while the same is not in use. When such complete discharge due to internal leakage does take place, improved means in my present invention are actuated to move the indicator 36 from its normal to its alternative position to display the word "Empty." To accomplish this result, I provide a solenoid 38, which has a core 39, united to the indicator 36 by means of a cord or string, as well indicated in Fig. 1. The other extremity of the indicator 36 is united by means of a cord to a spring 40, which serves to retain the indicator in its normal position. One terminal of the solenoid 38 is connected directly with the positive pole of the battery 12, while the remaining terminal of said solenoid is connected to an armature-controlling spring 41. The spring 41 is electrically connected to the armature 42 of the magnet 43, which armature 42 in its normal—that is, attracted—position is removed from a contact 44, which is directly connected to the negative terminal of the battery. The electromagnet 43 has one terminal directly connected to the negative pole of the battery 12, while the other terminal of the electromagnet is directly connected to the positive pole of the battery, so that the electromagnet 43 is at all times energized by current from the battery 12. The tension of the spring 41 is so regulated as to permit the armature 42 of said electromagnet to be attracted thereby at all times when the voltage of the battery is above the lowest predetermined value—that is, the discharge value.

When the voltage of the battery has been decreased to its discharge value, the armature 42 of the electromagnet 43 is retracted by the spring 41 and serves to close contact between the armature 42 and the contact 44, thereby closing the circuit through the solenoid 38 and permitting the same to attract its core 39. When the core 39 of the solenoid 38 is drawn within the solenoid 38, the indicator 36 is drawn along until the word "Empty" is displayed in the opening 37, indicating that the battery 12 has been completely discharged. As soon as the battery voltage again reaches its normal value the armature 42 of the electromagnet 43 is again attracted, thereby opening the circuit through the solenoid 38 and permitting the spring 40 to withdraw the indicator 36 to its normal position. At the same time that the indicator 36 is withdrawn to its alternative position—that is, to the position in which it displays the word "Empty" through the opening 37 the pointer 34 is moved to its zero or empty position by means of improved actuating mechanism provided for this purpose.

The pointer 34 is fixedly secured to a shaft having a gear-wheel 45, which is adapted to be engaged by a rack 46, mounted in a hanger 47, secured to the armature 42. The rack 46 is movable within the hanger and controlled in its movement by the armature 39. When the armature 42 is retracted, the rack 46 is placed into engagement with the gear 45, it at the same time being drawn to the left by the core 39, and placing the pointer 34 into its zero position. When the electromagnet 43 is again energized, the rack 46 is withdrawn from the gear 45, as will be readily apparent. In order to permit of this movement of the pointer 34, I mount the same upon the driving-shaft 48 of the counting mechanism through the interposition of a friction-clutch having an actuating-wheel 49, which is adapted to be engaged by prongs 50, fixedly secured to the gear-wheel 45. It will thus be seen that the pointer 34 may be moved in any direction without disturbing the remainder of the counting-train. The friction between the wheel 49 and the prongs 50 is of course at all times great enough to permit said pointer to be moved under the influence of said driving-shaft 48. The remainder of the counting-train may be similar to that ordinarily employed—as shown, for instance, in Fig. 4.

In Fig. 2 I have shown the alternative position of the indicator 36, in which the armature 42 has been retracted and the core 39 attracted, thereby placing the rack 46 into engagement with the gear 45 and removing the pointer thereby to its zero position, at the same time permitting the indicator 36 to display the word "Empty" through the opening 37.

In Fig. 6 I have shown improved means whereby the rack 46 may be held in the hanger 47, the hanger 47 being provided with overhanging teeth in which the circular supporting-bar 51 of the rack may be held and within which it may slide, a pin 52 or other suitable means being provided to prevent a rotation of said rack and bar 51.

While I have herein shown and particularly described the preferred embodiment of my invention, I do not wish to limit myself to the precise construction and arrangement as herein shown and particularly described; but,

Having thus described my invention, I claim as new and desire to secure by Letters Patent—

1. In an apparatus of the class described, the combination with a storage battery or other source of variable electromotive force, of an indicator, and means responsive to changes in voltage at said storage battery and adapted to move the indicator to an alternative position when the voltage of said storage battery has reached a predetermined value, substantially as described.

2. In an apparatus of the class described, the combination with a storage battery or other source of variable electromotive force, of an indicator adapted to be actuated when the voltage of the battery has reached a predetermined value, and means responsive to changes in voltage for causing said actuation, substantially as described.

3. In an apparatus of the class described, the combination with a storage battery or other source of variable electromotive force, of an indicator adapted to be actuated when the voltage of the battery has reached a predetermined minimum value, and means responsive to changes in voltage for causing said actuation, substantially as described.

4. In an apparatus of the class described, the combination with a storage battery or other source of variable electromotive force, of an indicator adapted to be actuated when the voltage of the battery has reached a predetermined value, and electromagnetic means responsive to changes in voltage of said battery for causing said actuation, substantially as described.

5. In an apparatus of the class described, the combination with a storage battery or other source of variable electromotive force, of an indicator adapted to be actuated when the voltage of the battery has reached a predetermined value, a solenoid having a core for moving said indicator, and an electromagnet responsive to changes in voltage of said storage battery for controlling the operation of the aforesaid solenoid, substantially as described.

6. In an apparatus of the class described, the combination with a storage battery or other source of variable electromotive force, of a pointer for indicating the electrical condition of said storage battery, a motive element for actuating said pointer, an indicator to indicate when the voltage of the storage battery has reached a predetermined value, an electromagnet for governing said indicator, and means also under the control of said electromagnet for removing the pointer to a zero position when the indicator has been actuated, substantially as described.

7. In an apparatus of the class described, the combination with a storage battery or other source of variable electromotive force, of a pointer for indicating the electrical condition of said storage battery, a motive element for actuating said pointer, an indicator to indicate when the voltage of the storage battery has reached a predetermined value, an electromagnet for governing said indicator, a pinion provided upon said pointer, and a rack also under the control of said electromagnet for engaging and moving said pointer to a zero position when the indicator has been actuated, substantially as described.

8. In an apparatus of the class described, the combination with a storage battery or other source of variable electromotive force, of a pointer for indicating the electrical condition of said storage battery, a motive element for actuating said pointer, frictional clutches interposed between said motive element and said pointer, an indicator to indicate when the voltage of the storage battery has reached a predetermined value, an electromagnet for governing said indicator, a pinion provided upon said pointer, and a rack also under the control of said electromagnet for engaging and moving said pointer to a zero position when the indicator has been actuated, substantially as described.

9. In an apparatus of the class described, the combination with a storage battery or other source of variable electromotive force, of an indicator, a solenoid having a core for actuating said indicator, an electromagnet responsive to changes in voltage of said storage battery for controlling the operation of said solenoid, a pointer and a motive element for actuating the same to indicate the electrical condition of the storage battery, a rack also operated by the core of the solenoid, and a pinion on said pointer, the said electromagnet controlling the engagement of the rack with the pinion, said rack being controlled in its longitudinal motion by the core of the aforesaid solenoid, substantially as described.

10. In a system of distribution, the combination with a storage battery, of a measuring element, a pointer adapted to be actuated by said measuring element, and means interposed between said measuring element and said storage battery to cause a torque to be exerted upon said measuring element when the external circuit of the storage battery is open, thereby to indicate the amount of battery leakage, substantially as described.

11. In a system of distribution, the combination with a storage battery or other source of variable electromotive force, of a meter, a pointer actuated by said meter, and a switch interposed between said meter and said storage battery, adapted in one position to connect the same to a charging source of current, in the second position to connect the same with translating devices, and in the third position permitting said storage battery to supply current to actuate the meter, substantially as described.

12. In a system of distribution, the combination with a storage battery or other source of variable electromotive force, of a meter, a pointer actuated by said meter, a switch for connecting the storage battery with a charging source of current or translating devices, said meter serving to measure the load or energy passing through the circuit in either of the aforesaid positions, and auxiliary torque-producing means associated with said meter and adapted to cause an actuation of the measuring element thereof when the switch is in neither of the aforesaid operating positions, substantially as described.

13. In a system of distribution, the combination with a storage battery or other source of variable electromotive force, of a meter, a pointer actuated by said meter, a switch for connecting the storage battery with a charging source of current or translating devices, said meter serving to measure the load or energy passing through the circuit in either of the aforesaid positions, auxiliary torque-producing coils associated with said meter and adapted periodically to exert torque upon said measuring element, and means associated with the aforesaid switch, whereby the same is adapted to cause the periodic energization of said auxiliary coils, substantially as described.

14. In a system of distribution, the combination with a storage battery or other source of variable electromotive force, of a meter, a pointer actuated by said meter, a switch for connecting the storage battery with a charging source of current or translating devices, said meter serving to measure the load or energy passing through the circuit in either of the aforesaid positions, auxiliary torque-producing coils associated with said meter and adapted periodically to exert torque upon said measuring element, and spring-contacts adapted to be engaged by the switch when in a third position, thereby to cause a periodic energization of the said auxiliary coils, substantially as described.

15. In a system of distribution, the combination with a storage battery or other source of variable electromotive force, of a meter, a pointer actuated by said meter, a switch for connecting the storage battery with a charging source of current or translating devices, said meter serving to measure the load or energy passing through the circuit in either of the aforesaid positions, auxiliary torque-producing coils associated with said meter and adapted periodically to exert torque upon said measuring element, spring-contacts, and a contact-bar associated with said switch adapted when the switch is in a third position to close circuit with said spring-contacts, thereby to cause an energization of said auxiliary coils, substantially as described.

In witness whereof I hereunto subscribe my name this 1st day of April, A. D. 1902.

THOMAS DUNCAN.

Witnesses:
GEORGE L. CRAGG,
HARVEY L. HANSON.